Figure 1:
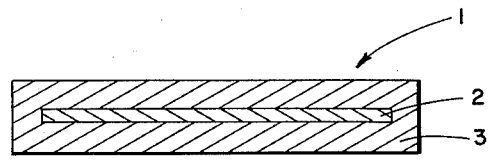

May 23, 1961   M. H. BINSTOCK ET AL   2,985,571
LEAD-URANIUM OXIDE NUCLEAR FUEL ELEMENT
Filed Nov. 9, 1956

*INVENTORS*
MARTIN H. BINSTOCK
KENNETH E. HORTON
BY

ATTORNEY ns
2,985,571
LEAD-URANIUM OXIDE NUCLEAR FUEL ELEMENT

Martin H. Binstock, Tarzana, and Kenneth E. Horton, Agoura, Calif., assignors to North American Aviation, Inc.

Filed Nov. 9, 1956, Ser. No. 621,305

5 Claims. (Cl. 204—154.2)

Our invention relates to an improved nuclear reactor fuel element, and more particularly to an improved fuel matrix for a plate-type fuel element.

For information concerning the theory, construction and operation of nuclear reactors, reference is made to U.S. Patents 2,708,656 and 2,714,577 Fermi et al.; Glasstone, "Principles of Nuclear Reactor Engineering" (D. Van Nostrand Co.); Schultz, "The Control of Nuclear Reactors" (McGraw-Hill); "The Reactor Handbook" (3 volumes), published by the U.S. Atomic Energy Commission; and to "The Proceedings of the International Conference on the Peaceful Uses of Atomic Energy," held in Geneva, Switzerland, August 1955, and available for sale at the United Nations' Book Store, New York, New York. For information concerning the fabrication of plate or MTR-type fuel elements, reference is made to the Geneva Conference paper of J. E. Cunningham and E. J. Boyle entitled "MTR-Type Fuel Elements." For specific information concerning reactors which employ this type of fuel element, attention is invited to the Geneva Conference paper of A. M. Weinberg et al. entitled "The Materials Testing Reactor and Related Research Reactors." As shown in the Cunningham paper, the plate-type fuel element consists of a plurality of long, slightly curved or flat plates comprising a core of uranium-aluminum alloy and a thin cladding of aluminum metal, resulting in a sandwich-type of construction. The cladding is used to retain fission products within the fuel and to protect the uranium from corrosion or other damage by the coolant. The plates are assembled in a hollow, rectangular box-like frame to form a composite fuel element.

This type of fuel element is fairly satisfactory and is in general use. The element possesses certain drawbacks, however. For example, aluminum forms a workable alloy with uranium at only rather high aluminum concentrations, for example, 85% aluminum-15% uranium, by weight. Therefore, the uranium for this alloy must be highly enriched (e.g., approximately 90%) in a thermal neutron fissile isotope U–233 or U–235 to achieve a chain fission reaction. Thus, this type of fuel plate would not be suitable where larger amounts of less enriched uranium are needed in a fuel plate for technical reasons or to meet administrative requirements, as in reactors for export where the use of only 20% enriched material is presently permitted.

An ideal fuel element would have to meet many strict requirements. The element would have to be sound from an economic viewpoint by permitting low cost fabrication and reprocessing. The element should be capable of long life at high burn-ups and be of chemically compatible and corrosion-resistant construction material. The element would further have to withstand radiation effects without distortion or other loss of physical integrity.

An object of our present invention, therefore, is to provide an improved nuclear reactor fuel element.

Another object is to provide an improved plate-type nuclear reactor fuel element of high uranium content.

Another object is to provide an economical plate-type fuel element which permits ease of fabrication and reprocessing.

Still another object is to provide such a fuel element of chemically compatible and corrosion-resistant material.

Yet another object is to provide such a fuel plate which will maintain its physical integrity under nuclear irradiation.

A further object is to provide such a fuel element which will be capable of long life at high burn-ups.

Other objects and advantages of our invention will become apparent from the following detailed description, taken together with the attached claims and the accompanying drawings.

Figure 2:
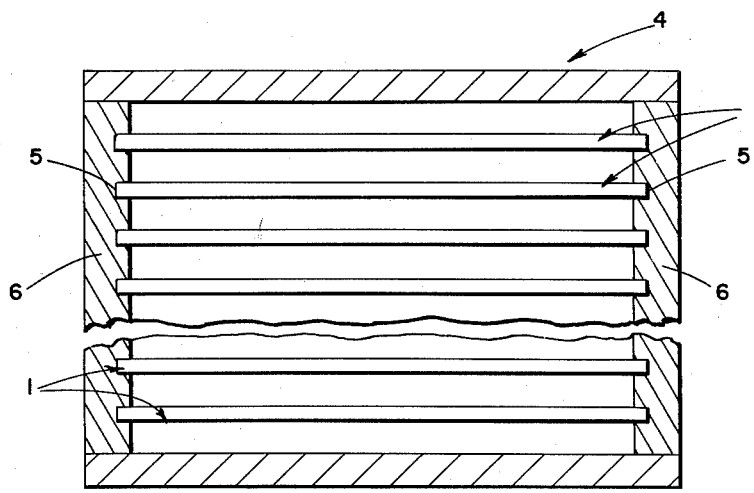

In the drawings, Figure 1 is a vertical section of an embodiment of our fuel plate and Figure 2 is a section of a composite fuel element containing the plates of Figure 1.

In accordance with the present invention, we have provided a fuel plate for a plate-type nuclear reactor fuel element, which comprises as its core a matrix of a refractory uranium compound and lead. High uranium concentrations are possible in our homogeneous mixture. The lead is an excellent binder, extremely ductile, and is of low thermal neutron absorption cross section; it is chemically compatible with the uranium compounds and cladding material. The uranium compound particles, as opposed to uranium metal, do not undergo phase or substantial dimensional changes under nuclear irradiation. The lead-uranium matrix may be easily and economically fabricated and the two very conveniently separated for later fuel reprocessing by simply melting the lead and physically separating it from the immiscible uranium. The result of the high physical integrity of the fuel plate is a fuel element capable of long life at high burn-up rates.

Suitable refractory uranium compounds for the present purpose include the oxides ($UO_2$, $UO_3$, $U_3O_8$), and the carbide and nitride. Uranium dioxide is preferred and, for clarity of presentation, our invention will hereinafter be illustrated specifically with respect to a lead-$UO_2$ matrix.

The lead-uranium oxide matrix is formed by uniformly mixing powders of lead and oxide. The composition of the mixture may satisfactorily vary as required by enrichment and criticality requirements, approximately 30–75% uranium compound, by weight, being quite suitable. With 20% enriched material, approximately 35 wt. percent $UO_2$ is preferred for an MTR-type plate. The particle size of the comminuted particles may likewise satisfactorily vary, a size of approximately −40 mesh being satisfactory while approximately +325/−40 mesh is preferred. The compact is then formed by normal compacting methods, which may or may not include sintering and hot pressing, the preferred method being by cold pressing at a pressure of approximately 15 tons per square inch.

The resulting thin wafers are then clad with a metal of suitable metallurgical and nuclear properties (i.e., relatively low thermal neutron absorption cross-section), such as aluminum, zirconium or stainless steel. For most applications aluminum is preferred. The thin wafer is then introduced into a tube of the cladding material, the tube evacuated and sealed off and a metallurgical bond formed between core and cladding. Since the typical fuel plate is approximately two feet long, it is more convenient to fabricate the core matrix initially as a plurality of shorter plates, say about four inches long, and then load these, one in contact with the next, into the cladding tube. Conventional bonding techniques may be used, such as cold or hot pressing. The preferred method is hot pressing at a temperature of approximately 200° C. to 250° C. and a pressure of approximately 15 tons per square inch. In Figure 1 is a section of a flat fuel plate 1 comprising a lead-$UO_2$ matrix 2 enclosed by the cladding 3.

A plurality of the flat plates, for example around 15, are assembled in a frame to form a single fuel element. As shown in Figure 2, a vertical section of the fuel element, the frame 4 is a hollow, rectangular box commonly of the same metal as the cladding. The fuel plates 1 are positioned longitudinally in frame 4 in longitudinal grooves 5 of side plates 6 and held parallel to one another. The fuel plates 1 are secured in side plates 6 by brazing with such known brazes as aluminum-silicon (approx. 11–13% Si) or by fusion welding. Hollow, tapered end pieces are attached to the ends of the fuel element, as illustrated in the Cunningham paper, supra, for insertion into the supporting grid plate of a reactor core.

A 15 plate fuel element of the above type is found to be completely interchangeable with the standard 18 plate MTR (Materials Testing Reactor) fuel element and may thus be used in any of the many reactors using the MTR element. The MTR fuel element contains 180 grams U–235 per element, regardless of the exact number of plates. The dimensions of such an element would be: frame, ⅛" aluminum, 3" x 3" x 2', 60 mil longitudinal grooves; fuel plate composition, 40 mil core, 35 wt. percent $UO_2$ (60 grams) 20% enriched in U–235, 20 mil aluminum cladding on each face; and dimensions of each fuel plate, 2 ft. long with 6 Pb-$UO_2$ plates 4" long x 2½" wide.

The table below is offered to illustrate the use of our fuel element in a 5 MW reactor with and MTR-type core. Examples are given of fuel elements with different numbers of plates per element and different thicknesses of the central core or "meat."

TABLE I

*Elements for a 5 MW reactor with an MTR-type core using lead-$UO_2$ fuel plates with 20% enrichment*

| Condition Considered | I | II | III | IV | V |
|---|---|---|---|---|---|
| Plates/element | 18 | 16 | 15 | 8 | 12 |
| "Meat" thickness, mils | 20 | 40 | 40 | 80 | 80 |
| Al cladding, mils | 20 | 20 | 20 | 20 | 20 |
| Water gap (between plates), inches | 0.113 | 0.115 | 0.129 | 0.308 | 0.142 |
| Vol. $H_2O$:Vol. $U^{235}$ | 235 | 220 | 230 | 270 | 200 |
| $N_{H_2O}$:$N_{25}$ | 160 | 150 | 160 | 185 | 140 |
| $K\infty$ | 1.68 | 1.20 | 1.20 | 1.69 | 1.73 |
| Fuel Loading (kg. $U^{235}$) | 5.04 | 5.4 | 5.22 | 4.68 | 7.2 |
| Elements (180 g. $U^{235}$ each) | 28 | 30 | 29 | 26 | 40 |
| Min. Velocity of coolant ft./sec | 1.1 | 1.3 | 1.4 | 2.2 | 2.0 |

The above examples are merely illustrative and should not be construed as limiting the scope of our invention, which is inherently very broad. Our invention should be understood to be limited only as indicated by the appended claims.

Having thus described our invention, we claim:

1. A method of forming a fuel plate for a plate-type nuclear reactor fuel element which comprises initimately mixing lead and a refractory uranium compound powder, pressing the resulting mixture together, and placing the resulting compact within a metal cladding having a relatively low thermal neutron absorption cross section and then metallurgically bonding, by hot pressing, the resulting assembly together to form a fuel plate.

2. The method of claim 1, wherein said uranium compound is selected from the group consisting of uranium oxides, uranium carbide and uranium nitride, and said metal is selected from the group consisting of aluminum, zirconium and stainless steel.

3. A method of forming a fuel plate for a plate-type fuel element which comprises intimately mixing 30–75 wt. percent uranium dioxide and lead powders, cold pressing the resulting mixture, inserting the resulting compact into an aluminum tube, then evacuating the compact-containing tube, and hot pressing the resulting assembly together to form an aluminum-clad, uranium dioxide-lead core fuel plate.

4. A method of forming a fuel plate for a plate-type fuel element which comprises intimately mixing 30–75 wt. percent of a refractory uranium compound selected from the group consisting of uranium oxides, uranium carbide and uranium nitride and the remainder lead, forming a compact of the resulting mixture, inserting the resulting compact into a tube of a metal having a relatively low thermal neutron absorption cross-section, then evacuating the compact-containing tube and hot pressing the resulting assembly together to form said fuel plate.

5. A method of forming a fuel plate for a plate-type fuel element which comprises intimately mixing 30–75 wt. percent of a refractory compound selected from the group consisting of uranium oxides, uranium carbide and uranium nitride, and the remainder lead, cold pressing the resulting mixture, inserting the resulting compact into a metal tube of a metal selected from the group consisting of aluminum, zirconium and stainless steel, then evacuating the compact-containing tube and hot pressing the resulting assembly together to form said fuel plate.

References Cited in the file of this patent

UNITED STATES PATENTS

| 1,931,370 | Bethel | Oct. 17, 1933 |
| 2,205,226 | Slepian | June 18, 1940 |
| 2,409,307 | Patch et al. | Oct. 15, 1946 |
| 2,696,661 | Kalischer | Dec. 14, 1954 |
| 2,711,484 | Knapp et al. | June 21, 1955 |

FOREIGN PATENTS

| 648,293 | Great Britain | Jan. 9, 1951 |
| 758,545 | Great Britain | Oct. 3, 1956 |

OTHER REFERENCES

Cunningham et al.: MTR-Type Elements, Proceedings of the International Conference on the Peaceful Uses of Atomic Energy (August 1955); vol. 9, publ. N.Y., 1956, by United Nations, pp. 203–207.

"Science and Engineering of Nuclear Power," edited by Goodman, 1948, vol. 1, p. 303.